M. W. FRANKLIN.
OZONATOR.
APPLICATION FILED AUG. 3, 1916.

1,337,062.

Patented Apr. 13, 1920.

Inventor:
Milton W. Franklin,
by
His Attorney.

UNITED STATES PATENT OFFICE.

MILTON W. FRANKLIN, OF BLOOMFIELD, NEW JERSEY, ASSIGNOR TO GENERAL ELECTRIC COMPANY, A CORPORATION OF NEW YORK.

OZONATOR.

1,337,062.        Specification of Letters Patent.        Patented Apr. 13, 1920.

Application filed August 3, 1916. Serial No. 112,943.

*To all whom it may concern:*

Be it known that I, MILTON W. FRANKLIN, a citizen of the United States, residing at Bloomfield, county of Essex, State of New Jersey, have invented certain new and useful Improvements in Ozonators, of which the following is a specification.

My invention relates to an apparatus for producing a gaseous reaction by an electric discharge, and more particularly relates to a machine for the production of ozone by such a discharge.

Ozonators have hitherto been constructed with a casing provided at either end with a chamber and glass tubes communicating with the chambers and sealed in the walls thereof by means of suitable gaskets. In devices of this character the casing was filled with water which surrounded the glass tubes and which constituted one of the electrodes, a second electrode was placed within the glass tube and a discharge took place within the space between the inner electrode and the glass tube when a suitable electric stress existed between the two electrodes, thereby converting the oxygen which was forced between the two electrodes into ozone.

In devices of this character the gaskets, by pressing on the glass tubes, put the same under a stress which made them liable to puncture by the discharge, and thus not only destroyed the tubes, but resulted in the flooding of the air and ozone chambers by the cooling water which surrounded the tubes.

In accordance with my present invention, these difficulties are overcome by the provision of metal tubes which are permanently sealed at their ends in the walls of the casing and within which the ozone units are located.

Figure 1:
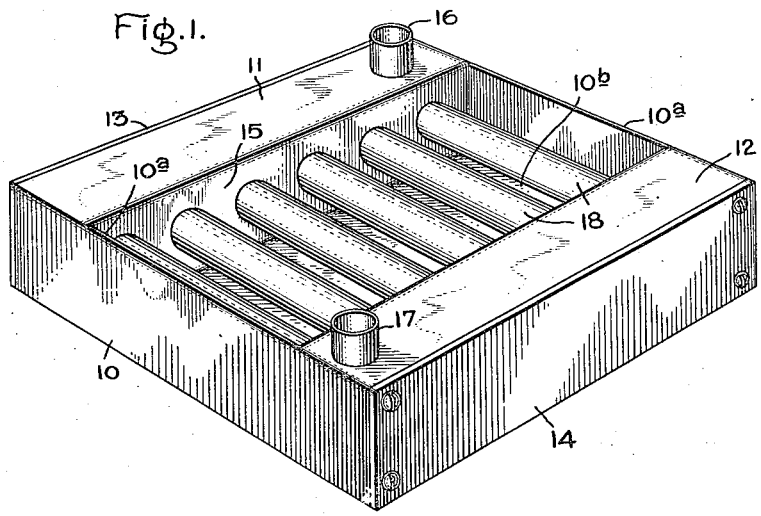
Figure 2:
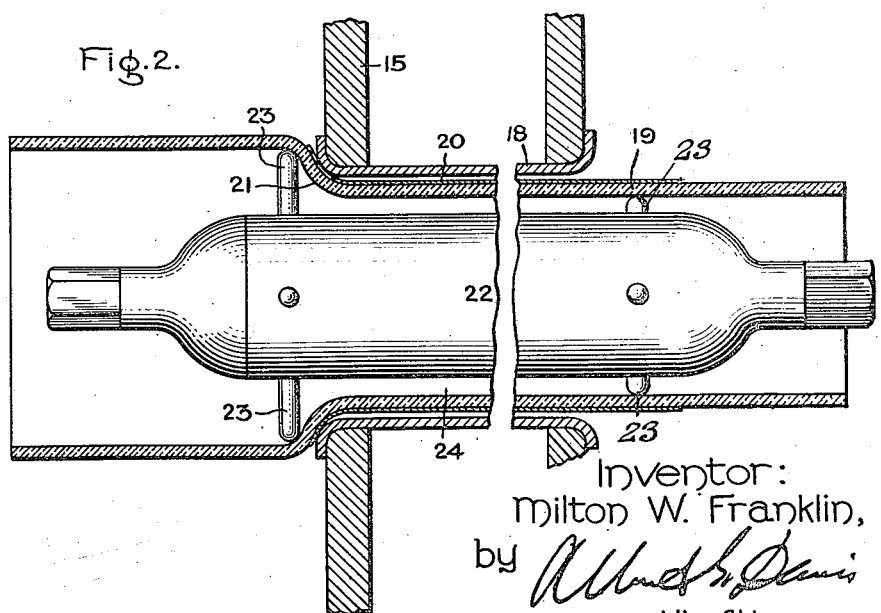

For a fuller understanding of my invention, reference may be had to the accompanying drawings in which Figure 1 is a perspective view of a casing within which the parts embodying my invention are located, and Fig. 2 is a longitudinal section illustrating the end portions of the ozone units which communicate with the respective chambers of the casing, the intermediate portions of the tubes being in part omitted as shown by the broken lines.

Referring now to the drawings, 10 is a water-tight casing, preferably of metal, comprising side plates $10^a$ and a bottom plate $10^b$, and formed at its ends with chambers 11 and 12. These chambers are closed at their ends by suitable removable plates 13 and 14 and inside by plates 15 (but one of which is shown in the drawing). Suitable pipes 16 and 17 communicate with the respective chambers 11 and 12, the one as 16 serving to supply air or oxygen to one of the chambers when the device in which my invention is embodied is to be used in the production of ozone, and the other 17 conducts the changed gas such as ozone away from the machine. One or more metal tubes 18 pass through openings in the walls 15 of the chambers 11 and 12 and communicate with said chambers. I have here shown one end of the tube 18 expanded to form a tight fit with the walls 15, although it will be understood that the metal tubes 18 may, if desired, be cast integrally with the walls 15. The ozone unit comprises a glass tube 19 which is metal coated, for example with copper, on its outer surface at 20. One process by which such a coating may be obtained is described in my Patent #1,037,887 which was issued September 10, 1912, although any suitable process may be used. Preferably the glass tube is flared outwardly at one end as at 21. When the glass tube is inserted in position in the metal tube, the copper or other coating which extends over the flared portion of the glass tube, is brought into engagement at its flared portion with the metal tube, thereby at once bringing the metal coating of the glass into electrical engagement with the metal tube, and forming a seal between the metal and glass tubes. A metal tube 22 of substantially smaller diameter than the inner diameter of the glass tube is located within said tube and is held substantially concentric therewith by suitable spacing members 23 so that a discharge space 24 is formed between the inner electrode 22 and the glass tube 19. When the terminals of a suitable source of energy are connected to the inner electrode and to the frame of the machine respectively, a discharge will take place between the inner electrode and the copper coating of the glass tube, it being observed that the copper coating and the metal tube are at the same potential.

It might at first thought seem that a more obvious way of accomplishing the same result would be to place a plain glass tube directly within the metal tube and cause a discharge to take place between the inner electrode and the metal tube itself, and if it were possible to obtain glass tubes that would perfectly fit the metal tubes, such a construction would in most cases be satisfactory. Commercial glass tubes, however, vary greatly among themselves, and it would therefore be necessary to provide a relatively large gap between the outside of the glass tube, and the inside of the metal tube, and this would result in a discharge taking place against the inner surface of the metal tube, which would soon ruin it. In accordance with my invention, the surrounding metal tube and the metal coating which conforms closely to the surface configuration of the glass tube are at the same potential, since they are in engagement at one or more points. Hence there is no tendency therefore for a discharge to take place against the inner surface of the metal tube.

It will of course be understood that suitable inlet and outlet pipes may be provided for causing a circulation of water within the container formed by the side plates 10a of the casing, the inner plates 15 of the chambers 11 and 12, and bottom plate 10b of the casing, for the purpose of keeping the electrodes cool. It will also be understood that the casing may be mounted on a suitable frame and that a blower will, in practice, usually be used for the purpose of forcing the gases through the ozone units. These details I have, for the sake of simplicity, omitted from the drawings.

In operation, air or oxygen is admitted by one of the pipes 16 or 17, say by the pipe 16, to the chamber 11 from which it passes through the glass tubes in the space 24 where a discharge takes place which converts the oxygen to ozone in a well known manner. The ozone so formed is discharged into the chamber 12 from which it is conducted to the desired point by the pipe 17.

In accordance with my invention, it will be seen that the ozone units may readily be placed in position within the metal tubes and as they are not subject to any appreciable stress they are not likely to be broken by the electric discharge, but in the event that a tube is broken, it will be apparent that the same may readily be renewed by simply removing one of the end plates 13 or 14, for example, the end plate 14 by which access may be had to the ozone chamber 12 and to the ends of the tubes. In no case can the cooling water gain admission to the air or ozone chambers, in the manner that has been common with ozonators of this general type when the glass tubes were punctured or otherwise broken.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A receptacle in which a cooling medium may be received, a conducting tube passing through said receptacle and sealed in the walls thereof, and an ozone unit located in said tube and comprising a dielectric tube having a metal coating on its outer surface closely adhering to the tube and electrically connected to said conducting tube and a metal electrode located within said glass tube and separated therefrom to form a space within which an electrical discharge may take place.

2. A receptacle in which a cooling medium may be received, a conducting tube passing through said receptacle and sealed in the walls thereof, an ozone unit located in said tube and comprising a dielectric tube provided with an electrolytically deposited metal coating on its outer surface, the coating being electrically connected to said conducting tube and a metal electrode located within said dielectric tube and separated therefrom to form a space within which an electrical discharge may take place.

3. An ozonator comprising a casing formed with a chamber at either end, a metal tube communicating with the respective chambers and sealed at its ends in the walls thereof, and an ozone unit located in said tube and comprising a glass tube flared outwardly at one end and having a metal coating on its outer surface extending over the flared portion and brought into engagement with the metal tube at its end, the metal coating constituting one electrode, and a second electrode located within and spaced from the glass tube.

4. An ozone device comprising an inclosing tubular electrode, a dielectric tube disengageably mounted therein, a coöperating electrode located within said dielectric tube and spaced away therefrom, and a layer of conductive material conforming closely with the surface configuration of said dielectric tube and connected electrically to said inclosing tubular electrode, thereby preventing the occurrence of an electric discharge between said dielectric tube and said inclosing electrode.

5. An ozone device comprising a dielectric tube, an electrode within said tube and separated therefrom by a space for the passage of an ozonizing discharge, a tubular electrode surrounding said dielectric tube and conducting means between the exterior electrode and said dielectric tube for equalizing the potential of said tubular electrode and the potential at the outer surface of said dielectric tube whereby the passage of an electric discharge between the dielectric tube and the inclosing tubular electrode is prevented.

6. An ozone unit comprising a dielectric tube, a coating of conductive material adhering to the outer surface of said tube and conforming closely to the surface configurations thereof, an electrode located within said tube and means for holding said electrode in fixed position spaced away from said tube.

7. An ozone unit comprising a dielectric tube having a flared end, a coating of conductive material thereon conforming closely to the surface configuration of said tube, an electrode within said tube and spacing means for holding said electrode in fixed position out of contact with said tube.

In witness whereof, I have hereunto set my hand this first day of August, 1916.

MILTON W. FRANKLIN.